(12) United States Patent
Binning et al.

(10) Patent No.: US 7,268,348 B2
(45) Date of Patent: Sep. 11, 2007

(54) SCANNING PROBE FOR DATA STORAGE AND MICROSCOPY

(75) Inventors: Gerd K. Binning, Wollerau (CH); Michel Despont, Adliswil (CH); Walter Haeberle, Waedenswil (CH); Mark A. Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 10/502,366

(22) PCT Filed: Dec. 11, 2002

(86) PCT No.: PCT/IB02/05292

§ 371 (c)(1), (2), (4) Date: May 31, 2005

(87) PCT Pub. No.: WO03/062742

PCT Pub. Date: Jul. 31, 2003

(65) Prior Publication Data

US 2006/0043288 A1    Mar. 2, 2006

(30) Foreign Application Priority Data

Jan. 22, 2002 (EP) ................... 02405034

(51) Int. Cl.
G01N 13/16  (2006.01)

(52) U.S. Cl. .......... 250/306; 250/309; 73/105
(58) Field of Classification Search .......... None
See application file for complete search history.

(56) References Cited

U.S. PATENT DOCUMENTS

| 6,079,255 A | 6/2000 | Binnig et al. |
| 2004/0218507 A1* | 11/2004 | Binnig et al. ........ 369/154 |

\* cited by examiner

*Primary Examiner*—Nikita Wells
(74) *Attorney, Agent, or Firm*—F. Chau & Associates LLC

(57) ABSTRACT

A cantilever device for scanning a surface comprises a support, a tip platform and a flexible arm arrangement. The tip platform has a plurality of tips. These comprise at least two contact tips providing points of contact with a surface to be scanned, and a scanning tip for scanning the surface, where the scanning tip may be one of the two or more contact tips provided on the platform. The flexible arm arrangement connects the tip platform to the support and allows orientation of the platform, via flexing of the arm arrangement, to bring the contact tips into contact with a surface to be scanned. The platform is then at a well-defined orientation relative to the scan surface, and the scanning tip is appropriately positioned for the scanning operation. Scanning probe microscopes and data storage devices incorporating such cantilever devices are also provided.

30 Claims, 4 Drawing Sheets

SCANNING PROBE FOR DATA STORAGE AND MICROSCOPY

FIELD OF THE INVENTION

This invention relates generally to scanning probe data storage and microscopy systems. Particular embodiments of the invention provide cantilever devices for use in such systems, and scanning probe microscopes and data storage devices incorporating these cantilever devices.

BACKGROUND OF THE INVENTION

Scanning probe microscopes are devices such as AFMs (Atomic Force Microscopes), STMs (Scanning Tunnelling Microscopes) and SNOMs (Scanning Near-Field Optical Microscopes) where operation is based on interaction between a sample surface and a probe in the form of a microfabricated tip. In the AFM, for example, the topography of a sample is sensed using a tip mounted on the end of a microfabricated cantilever to scan the sample surface. Here, the interaction of atomic forces between the nanometer-sharp tip and the sample surface causes pivotal deflection of the cantilever during scanning, and the sample topography is determined by detecting this deflection. This basic principle can be exploited in a variety of operational modes. The tip may be continuously in contact with the sample surface, or the tip may be brought into close proximity with the surface for operation in the so-called "tapping mode". In some cases, a well-defined force is applied during scanning by application of a voltage between the cantilever and sample. Deflection of the cantilever can be sensed in a variety of ways, for example using piezoelectric or proximity sensors, or using optical detection methods such as laser interferometry.

The AFM technology has also been applied to the field of data storage with a view to providing a new generation of high-density, high data-rate storage devices for mass-memory applications. AFM-based data storage is described in detail in IBM Journal of Research & Development, Volume 44, No. 3, May 2000, pp 323-340, "The 'Millipede'—More Than One Thousand Tips for Future AFM Data Storage", Vettiger et al., and the references cited therein. Here, the cantilever-mounted tip is used to scan the surface of a data storage medium. In a write-scan mode, the tip is used to write data to the surface by creating pits, or bit indentations, in the surface. To write a data bit, a heater on the cantilever is activated to heat the surface at the point of contact with the tip, allowing the tip to penetrate the surface to create a pit. Such a pit represents a bit of value "1", a bit of value "0" being represented by the absence of a pit at a bit position. In a read-scan mode, the tip is used to read data by detecting the deflection of the cantilever as the tip is moved over the pattern of bit indentations. Here, the cantilever heater, operated at a lower temperature, can conveniently be employed as a proximity sensor since more heat is lost to the storage medium when the tip enters a bit indentation than when no bit indentation is present. Thus, as the tip moves over the bit positions, changes in the temperature-dependent resistance of the heater can be detected to determine the bit pattern. While basic data read/write operations can be implemented in this way using a single cantilever, in practice an integrated array of cantilevers is employed as discussed in the paper referenced above.

Various cantilever designs have been proposed for use in scanning probe microscopy and data storage applications. U.S. Pat. No. 6,079,255, for example, discloses various cantilever designs in which more than one tip is provided on the cantilever. These designs essentially involve two or more mechanically coupled cantilevers: a main, larger cantilever carrying one tip; and one or more smaller cantilevers, each with their own tip, provided within the body of the main cantilever. These designs aim to provide a degree of fine tuning, the main, larger cantilever being used, for example, for low-resolution scans, and the smaller cantilever(s) being used selectively for higher resolution scans. The mechanical coupling of the cantilevers also provides some degree of course position control for the smaller cantilevers in that these are coupled to, and hence follow the movement of, the main, larger cantilever.

In general in scanning probe based devices, some form of alignment procedure is required to ensure proper alignment of the cantilever, in particular to achieve the required orientation of the cantilever and appropriate positioning of the scanning tip relative to the scan surface. In many cases, e.g. where laser interferometry is used for detecting the movement of the cantilever or a force is applied to the cantilever by application of a voltage, the angle of the cantilever should be well-defined with respect to the detecting optical beam or the scan surface. Moreover, depending on the particular application and operating mode, the tip must be brought into gentle contact with the scan surface or into close proximity with the surface. The alignment procedures required to achieve these objectives can be complex and time consuming, and it is often necessary to employ feedback mechanisms to maintain alignment within system parameters. The issue of alignment is particularly problematical where a plurality of cantilevers are operated in parallel as with the data storage array mentioned above. Here, the plane of all cantilever tips should be parallel to the scan surface, but with the integrated array aligned parallel to the surface no further freedom remains for adjusting the orientation of individual cantilevers.

SUMMARY OF THE INVENTION

According to one aspect of the present invention there is provided a cantilever device for scanning a surface, the device comprising:

a support;

a tip platform having a plurality of tips comprising two contact tips providing points of contact with a surface to be scanned and a scanning tip for scanning the surface; and a flexible arm arrangement connecting the tip platform to the support and allowing orientation of the platform, via flexing of the arm arrangement, to bring the contact tips into contact with a surface to be scanned.

In embodiments of the present invention, therefore, the cantilever is formed by a tip platform which is connected to the support by a flexible arm arrangement, and two (at least) contact tips are provided on the tip platform. These contact tips provide points of contact with a surface to be scanned. As the platform is brought into engagement with the surface to be scanned, the arm arrangement flexes to allow the platform to orientate itself, bringing the contact tips into contact the scan surface. The platform is then at a well-defined orientation relative to the scan surface, and the scanning tip provided on the platform is appropriately positioned for the scanning operation. The design therefore provides a self-aligning cantilever device, significantly alleviating the difficulties of alignment presented by prior devices discussed above. Use of devices embodying the invention can render feedback mechanisms obsolete, and, where these mechanisms are employed, offers greater precision in the feedback operation.

In some embodiments of the invention there may be only two contact tips. This provides for self-orientation of the platform about an axis perpendicular to a line joining the two contact tips. While orientation about a single axis may be sufficient for some applications, in others orientation about two orthogonal axes may be required. The tip platform in some embodiments may therefore have three non-aligned contact tips providing points of contact with the scan surface. Because the three contact tips are non-aligned, the free ends of these tips essentially define a plane relative to which the orientation of the platform is known. As the platform is brought into engagement with the scan surface, flexing of the arm arrangement allows the platform to orientate itself about two axes, bringing all three contact tips into contact the scan surface, whereupon the platform is then correctly aligned. While the use of only three contact tips here minimises wear on the scan surface, it may be appropriate to employ more than three contact tips in some embodiments. In these cases, the arrangement is such that the free ends of the contact tips lie substantially in the same plane since these tips provide the points of contact with the scan surface and thus determine the alignment of the platform in operation. The platform itself may comprise any convenient structure for carrying the tips, but ideally comprises a substantially planar structure, the orientation of the plane of the platform relative to the contact plane defined by the free ends of the contact tips giving the required orientation of the platform relative to the scan surface in operation. Embodiments might be envisaged where it is desirable for the platform to be orientated at an angle to the scan surface in operation. However, in the preferred examples described below, the plane of the platform is substantially parallel to the contact plane defined by the contact tips, whereby the platform is orientated substantially parallel to the scan surface in operation. This provides a simple, compact construction, and allows a well-defined force to be applied in applications where the platform is employed as an electrode.

The scanning tip may be provided in addition to the contact tips, or may itself be one of the two, three or more contact tips provided on the tip platform. For example, in some applications scanning is performed with the scanning tip close to, but not in contact with, the scan surface. For these applications the scanning tip is provided in addition to the contact tips, the arrangement being such that the scanning tip is appropriately spaced from the scan surface when the contact tips engage the surface. In other applications, scanning is performed with the scanning tip in contact with the scan surface. Here, again, the scanning tip could be provided in addition to the contact tips, but in this case the scanning tip may itself be one of the contact tips. Moreover, in general one or more scanning tips, each of which may be one of the contact tips, may be provided on the platform. In the limiting case therefore, for applications requiring alignment about one axis there may be only two tips on the platform, and for applications requiring alignment about two axes there may be only three tips on the platform, all of these tips being contact tips in each case and one or more the tips being a scanning tip.

In operation, the (or each) scanning tip interacts with the scan surface and this interaction is detected to obtain the scan readout. This can be achieved in a variety of ways in different embodiments. For example, embodiments can be envisaged where the scanning tip is subjected to constant-amplitude vibration, and variations in the vibration frequency due to interaction with the scan surface are detected to obtain the scan readout. As another example, a feedback mechanism could be employed to maintain a constant spacing between the scanning tip and scan surface against the force of interaction, the adjustment required in response to the interaction force being measured to obtain the scan output. In other cases, however, the scanning tip is simply mounted on the platform for movement generally perpendicular to the extent of the scan surface to allow the tip to follow the surface topography (e.g. for AFM surface scanning or read scanning in data storage applications) and/or to penetrate the surface (for write scanning in data storage applications) as appropriate. Here, only a component of the overall movement described by the scanning tip need be generally perpendicular to the extent of the scan surface, the point being that the scanning tip can move in some manner towards and away from the general plane of the surface in order to perform the required scanning function. The scanning tip may be mounted for such perpendicular movement in a variety of ways. As a simple example, an embodiment can be envisaged where there are three contact tips, one of which is the sole scanning tip, and the scanning tip movement is provided by tilting of the platform as a whole about an axis between the two remaining contact tips. In preferred embodiments, however, the or each scanning tip is mounted on the platform for independent movement generally perpendicular to the extent of the surface. In these embodiments, the scanning tip has at least some degree of freedom of movement, perpendicular to the scan surface, independently of the platform as a whole. This movement could be provided, for example, by bending or flexing of part of the platform, but, in particular preferred embodiments as described hereinafter, the (or each) scanning tip is connected to the platform by a plurality of flexible connecting portions providing for movement of the scanning tip towards and away from the scan surface.

Where there are more than three contact tips one or more of which is a scanning tip mounted for independent movement as just described, the free ends of these tips lie substantially in the same plane within the limits of freedom of movement of the scanning tip(s). It will be appreciated that, in embodiments where, for example, a scanning tip is one of only three contact tips, then perpendicular movement of the scanning tip in operation can have some effect on the overall orientation of the platform. This may not be a concern in some embodiments, and may even be desirable, e.g. where it is precisely these changes in orientation which are detected to derive the scan output as in the tilting-platform arrangement suggested above. However, where it is desired to maintain platform orientation as constant as possible, then the spacing of the contact tips should be large compared to the extent of the perpendicular movement of the scanning tip, in particular so that platform movements resulting from the scanning tip movement are within acceptable system limits, e.g. within system noise levels. In general in embodiments of the invention, it will be desirable for the spacing of the contact tips to be large compared to the scanning tip size. Such a comparatively large contact tip spacing promotes good platform stability and improves effectiveness of the torque which brings a slightly misaligned cantilever into reliable alignment during engagement with the scan surface, as well as reducing the effect of scanning tip movement on desired platform orientation and/or scanning tip positioning as appropriate. Clearly, the relative dimensions here can be selected according to the parameters of a particular system, but in preferred embodiments the contact tip spacing is at least about ten times the height of the scanning tip, and more preferably about 100 times the scanning tip height.

Where the scan output is obtained by detecting movement of the scanning tip, various detection mechanisms can be employed. Some embodiments may employ optical detection or other techniques which do not require specific sensor mechanisms on the cantilevers themselves. In other embodiments, and particularly where the scanning tip is mounted for some degree of independent movement, the cantilever may include a sensor associated with the (or each) scanning tip for sensing the scanning tip movement. Such a sensor may comprise more than one sensor element, for example one element associated with each of the flexible connecting portions mentioned above where provided. Where the sensor must be directly connected in an electrical circuit, a current path can be provided via the platform and flexible arm arrangement of the cantilever for connection of the sensor between a pair of supply lines on the support. Such a current path could be provide by conductive tracks, but is preferably provided by forming the platform and arm arrangement, or parts thereof, from conductive material.

It is the flexing of the arm arrangement which allows the orientation of the platform to bring the contact tips into contact with the scan surface, the flexible arrangement thus providing the necessary bending and/or twisting action. While an arrangement having a single flexible arm might be envisaged, particularly effective arrangements have a plurality of flexible arms extending between the platform and support. In such preferred embodiments, where the scanning tip is mounted for independent movement, for example via the flexible connecting portions mentioned above, the scanning tip may itself be connected to the support by a flexible arm of the arrangement to provide improved stability in operation. In any case, in particularly preferred embodiments the or each flexible arm comprises some form of lattice structure. That is, the arm comprises an open framework such as a ladder or other open structure with longitudinal elements interconnected by cross-pieces. Such a lattice structure is highly effective in providing the required flexibility for bending/twisting, with the added advantage of strength in the longitudinal direction. This allows the movement necessary for self-alignment while preserving positional accuracy in the longitudinal direction.

In addition to the contact and scanning tips, cantilever devices embodying the invention may have a plurality of guard tips disposed adjacent edges of the platform to inhibit contact, during scanning, between these edges and the surface being scanned. Such guard tips can be employed wherever there is a perceived risk of sides or corners of the device "catching" on the scan surface during operation.

A further aspect of the invention provides scanning probe microscope comprising:
a sample support for supporting a sample to be scanned; a cantilever device as hereinbefore described, the cantilever device being movable relative to the sample support for scanning the surface of a sample supported thereby; and a detector for detecting interaction of the or each scanning tip with the surface during scanning.

As noted above, cantilever devices embodying the invention can be employed for data storage as well as microscopy applications. Thus, particular embodiments of the invention provide a cantilever device as hereinbefore described for scanning the surface of a data storage medium to read and write data thereon, wherein: the or each scanning tip is arranged for contacting the surface in use; the device includes a heater associated with said scanning tip for heating the surface at the point of contact with the scanning tip to allow penetration of the scanning tip; and the platform and arm arrangement provide a current path for electrical connection of the heater between a pair of electrical supply lines on the support. Here, a given scanning tip is preferably used selectively for both read and write scans, the heater employed for data writing being used as a proximity sensor for read sensing as discussed earlier. To provide for contact between the scanning tip and storage medium surface in use, the scanning tip is preferably a contact tip as described above. In other embodiments, however, an actuator mechanism could be provided to bring the scanning tip into contact with the surface when required. A further aspect of the invention provides a data storage device comprising: a data storage medium; a cantilever device as hereinbefore described, the cantilever device being movable relative to the data storage medium for scanning the surface thereof; and a detector for detecting movement of the scanning tip generally perpendicular to the extent of the surface during scanning.

Another aspect of the invention provides scanning apparatus comprising: an array of cantilever devices, each cantilever device being a device as hereinbefore described; and a support structure providing said support for each cantilever device and interconnecting the cantilever devices to form an integrated array. Respective further aspects of the invention provide data storage devices and scanning probe microscopes including such scanning apparatus.

BRIEF DESCRIPTION OF THE DRAWINGS

Preferred embodiments of the invention will now be described, by way of example, with reference to the accompanying drawings in which.

DETAILED DESCRIPTION OF THE INVENTION

Before describing the preferred embodiments in detail, it is useful to consider briefly the basic design and operation of known cantilever devices in scanning probe applications in which cantilever devices embodying the invention can be similarly employed.

Figure 1:
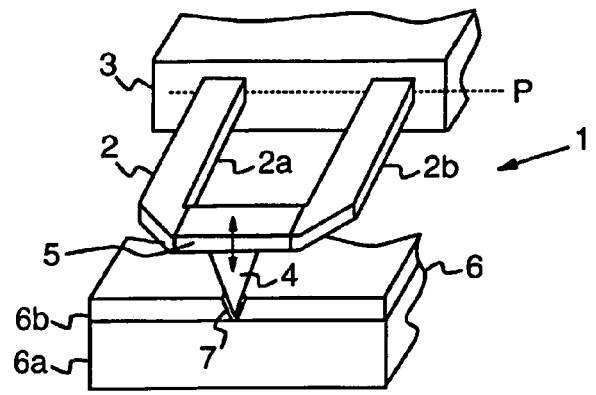
FIG. 1 illustrates the general structure of a known cantilever device for data storage applications.

Considering first data storage applications, a known read/write device 1 of an AFM-based data storage system is shown schematically in FIG. 1. The device 1 comprises a generally U-shaped microfabricated cantilever 2 which is connected to a support structure 3 (only partially shown in the figure). A read/write scanning tip 4 is provided on a heater 5 at the end of the cantilever 2, and the highly-doped silicon cantilever legs 2a, 2b define a current path connecting the heater 5 between a pair of electrical supply lines (not shown) on the support 3. In operation, the read/write tip 4 is biased against the surface of a data storage medium indicated schematically at 6 and shown here in cross-section. Here, the storage medium comprises a silicon substrate 6a and a 40 nm-thick polymer surface layer 6b. Flexing of the legs 2a, 2b of the cantilever 2 provides for substantially pivotal movement of the cantilever about a pivot axis P and hence movement of tip 4 generally perpendicular to the extent of the storage medium surface.

In the write-scan mode, the heater 5 can be heated to a writing temperature by application of a voltage between the supply lines. The consequent heating of the tip 4 results in local melting of the polymer surface layer 6a allowing the tip 4 to penetrate the surface layer to form a pit, or bit indentation, 7. Such a pit represents a bit of value "1", a bit of value "0" being represented by the absence of a pit. The storage medium 6 can be moved relative to the device 1 allowing the scanning tip 4 to write data over an area of the surface, or "storage field", during a write scan. In the read-scan mode, the heater 5 is used as a thermal sensor by exploiting its temperature-dependent resistance. A voltage is applied between the supply lines to heat the heater to a reading temperature which is less than the writing temperature and not high enough to melt the polymer. As the storage field is scanned by the tip 4, the pivotal position of the cantilever 2 differs at each bit position according to the presence or absence of a pit 7. In the absence of a pit, the distance between the heater 5 and storage medium 6 is greater than the corresponding distance when a pit is present and the tip enters the pit. Heat transport across the air gap between the heater 5 and storage medium 6 is thus more efficient when a pit is present at a bit position, and the temperature of heater 5, and hence its resistance, will then be reduced. Thus, as the storage field is scanned, the data bits are detected by monitoring changes in the temperature-dependent resistance of the heater 5 indicative of scanning tip movement.

Figure 2:
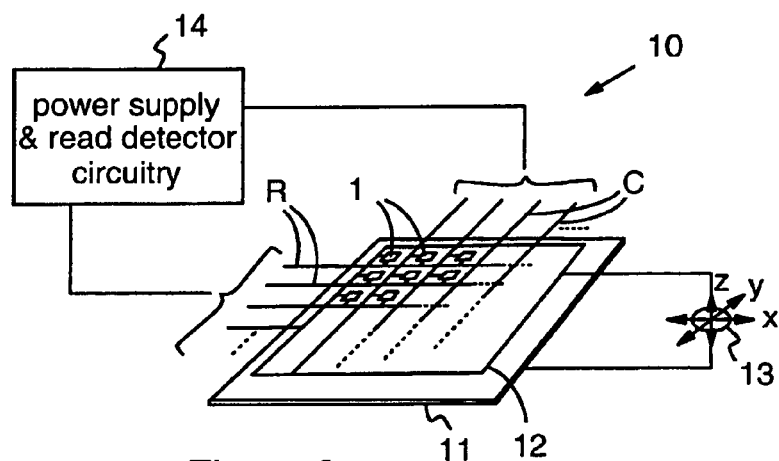
FIG. 2 is a schematic illustration of a known data storage device.

In practice in data storage applications, an array of such read/write devices is employed as illustrated schematically in FIG. 2. Here, a data storage device 10 includes a data storage medium 11 and read/write scanning apparatus in the form of an integrated array 12 of read/write devices 1 as described above. Each read/write device 1 is connected to two supply lines, a row supply line R and a column supply line C, as indicated schematically in the figure. All devices 1 in the same row of the array share the same row supply line R, and all devices 1 in the same column of the array share the same column supply line C. A drive mechanism, indicated schematically at 13, effects the relative movement of the array and storage medium, whereby the array can be located in its operating position against the storage medium and, during operation, each device 1 can scan its individual storage field. The row and column lines R, C of array 12 are connected to power supply and read detector circuitry indicated generally at 14. Circuitry 14 operates to supply power to the devices 1 for write and read scanning, the individual devices being addressed by their row and column lines, one row at a time, via row and column multiplexers (not shown separately) of circuitry 14. The read detector circuitry of block 14 operates during read scans to detect the bit values indicated by the thermal sensors 5 of devices 1 as described above, conveniently by measuring the voltage across series resistors connected in the column lines C of array 12.

Figure 3:
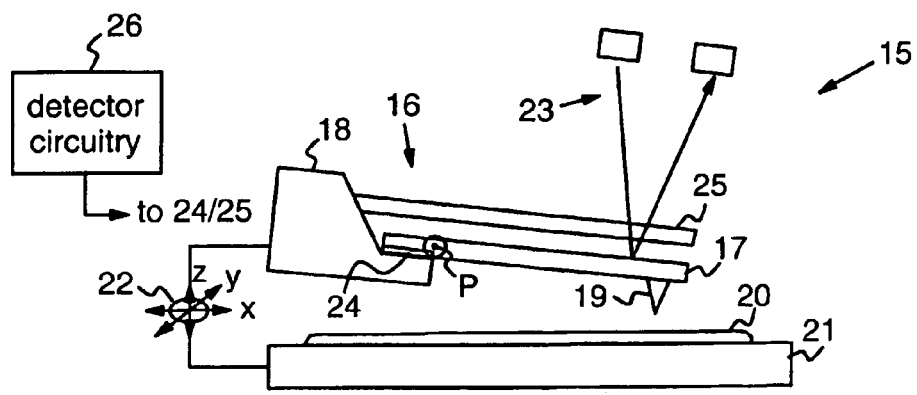
FIG. 3 is a schematic illustration an atomic force microscope illustrating the basic detection mechanisms employed in known systems.

Considering now microscopy applications, FIG. 3 is a schematic representation of an AFM 15 illustrating in the same diagram the three basic detection mechanisms employed in the art. The scanning device 16 of the AFM comprises a microfabricated cantilever 17 connected to a support structure 18 for substantially pivotal movement about a pivot axis P, this movement being provided as before by flexing of the cantilever body. The scanning tip 19 is disposed at the end of the cantilever remote from the support 18. In operation, a sample 20 to be analysed is placed on a sample support 21. A drive mechanism, indicated schematically at 22, effects relative movement of the device 16 and sample support 21 such that the sample is scanned by the tip 19. During scanning, interaction of atomic forces between the tip and sample surface effects pivotal movement of the cantilever 17 due to the generally perpendicular movement of the tip, and the topography of the sample is revealed by detecting this movement. The three basic detector systems are indicated generally at 23, 24 and 25, though in practice of course only one of these systems is employed. The first system employs an optical technique such as laser interferometry to detect movement of the cantilever as indicated schematically at 23. The second system utilises a piezoelectric sensor 24 which senses the stress caused by the pivotal deflection of the cantilever and is connected via the support to appropriate detector circuitry 26. The third system uses capacitive sensing, the cantilever 17 being employed as one electrode which, together with an in-line electrode 25 mounted above the cantilever, is again connected to appropriate detector circuitry 26. Electrode 25 thus serves as a proximity sensor for the cantilever 17, the distance between the cantilever and in-line electrode 25, and hence voltage drop detected by circuitry 30, varying with the cantilever deflection caused by scanning tip movement.

Preferred embodiments of cantilever devices which can be employed as scanning or read/write devices in the above systems will now be described with reference to FIGS. 4 to 9. (In this regard, while an AFM has been described above as one particular example of a scanning probe microscope, it will be understood that embodiments of the invention may be equally employed in other scanning probe microscopes such as STMs and SNOMs for example).

Figure 4:
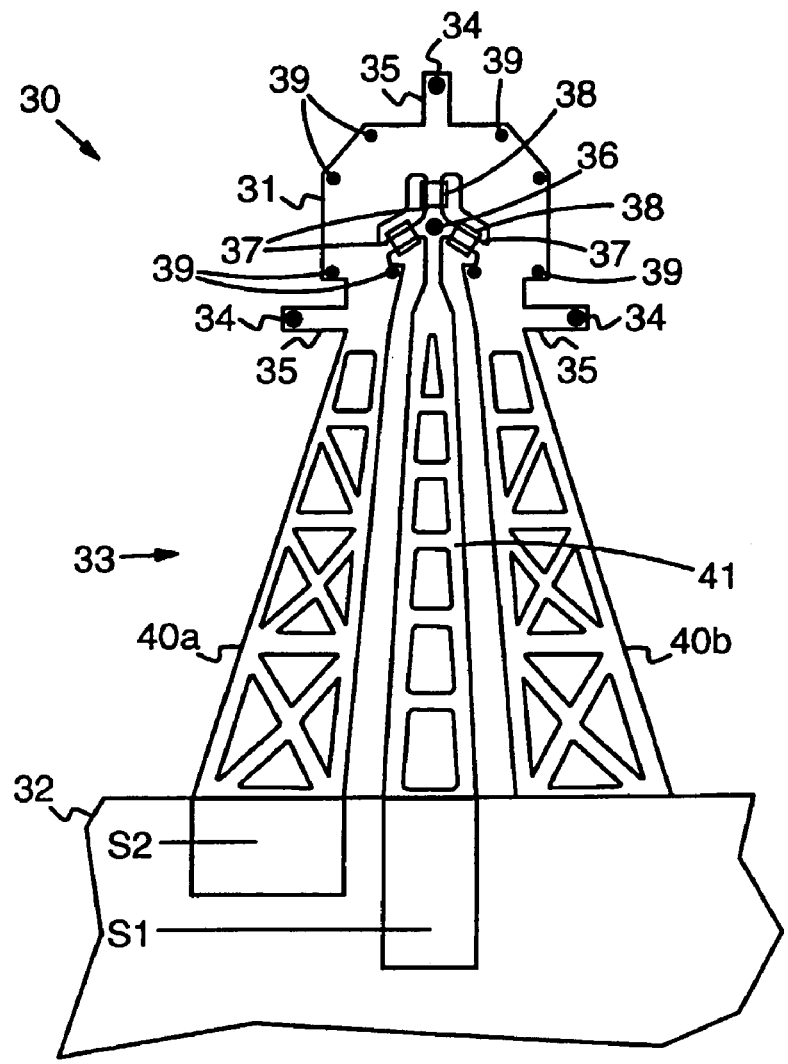
FIG. 4 is a schematic illustration of a first cantilever device embodying the invention.

Referring first to FIG. 4, the cantilever device 30 of this embodiment comprises a tip platform 31 which is connected to a support 32 (only partially shown in the figure) by a flexible arm arrangement indicated generally at 33. The platform 31 has a generally flat, plate-like structure in this embodiment. Three contact tips 34 are symmetrically spaced around the perimeter of the platform, each contact tip 34 being located on an extension 35 of the platform here to increase the relative spacing of these tips. A scanning tip 36 is mounted substantially centrally of platform 31, the scanning tip 36 being connected to the main body of the platform by three, symmetrically disposed, flexible connecting portions 37. These connecting portions 37 are formed by narrow strips of the platform structure which have sufficient inherent flexibility to allow limited reciprocal movement of scanning tip 36, independently of the main body of the platform, out of the plane of the figure. A sensor is provided on the platform for sensing this movement of the scanning tip as discussed further below. In this embodiment, the sensor is implemented by three sensor elements indicated schematically at 38. These elements are located close to the scanning tip 36, one formed on each of the connecting portions 37. A plurality of guard tips 39 are also provided on platform 31. These tips are disposed adjacent edges, and particularly external corners, of the platform structure, though not sufficiently close to the scanning and contact tips potentially to interfere with the functioning of these as discussed below.

The flexible arm arrangement here consists of three flexible arms, a pair of outer flexible arms 40a, 40b and a central flexible arm 41. Each of the outer arms 40a, 40b extends between the support 32 and a respective side of the platform 31, and the central arm 41 connects the scanning tip 36 to the support as shown. Each arm 40a, 40b, 41 is formed with a lattice structure or open framework having longitudinal members interconnected by cross-pieces. For central arm 41 the lattice structure is generally in the form of a ladder, whereas for outer arms 40a, 40b the lattice structure is formed with mainly triangular open sections giving angled cross-pieces as illustrated.

The various elements of cantilever device 30 are fabricated using semiconductor processing techniques of generally known type. The platform and arm arrangement here are formed of highly-doped silicon to provide a conductive path via the central arm 41, connecting portions 37 with sensor elements 38, the platform 31 and the outer flexible arms 40a, 40b. Here, central arm 41 and outer arm 40a are connected to respective electrical supply lines S1, S2 on the support 32, whereby the sensor can be connected in a circuit with power supply and detector circuitry such as elements 14 and 26 in FIGS. 2 and 3.

Figure 5:
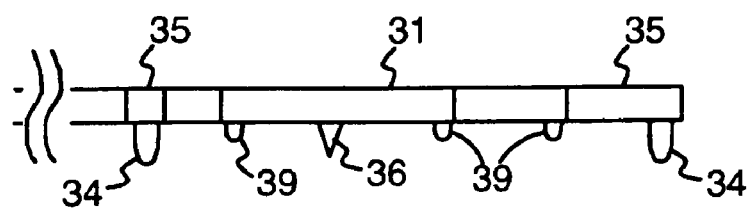
FIG. 5 is a partial side view of the device of FIG. 4.

FIG. 5 is a schematic side view of the platform end of cantilever device 30 illustrating the various tips in more detail. The contact tips 34 are all the same size and have blunt, rounded ends for minimising wear on the scan surface. The scanning tip 36 is nanometer-sharp and in this particular example is shorter than contact tips 34 for operation close to, but spaced from, the scan surface. The guard tips 39 are small, blunt tips which generally do not engage the scan surface. These tips serve to protect the scan surface by inhibiting contact between the adjacent side or corner of platform 31 and the scan surface as the platform is brought into its operating position. In particular, as the platform is brought into engagement with the scan surface, one or more of contact tips 34 will engage the surface first. Flexing of the arm arrangement 33 then provides the necessary bending and twisting action to allow torque on the platform about the engaged tip(s) to orientate the platform until all three contact tips 34 engage the surface. The platform is then aligned parallel to the scan surface with the scanning tip correctly located for the scanning operation. The symmetrical arrangement and large spacing of the contact tips here provides a highly stable operating position with reduced sensitivity to vibration. (While dimensions are not shown to scale in the figures for ease of representation, in this embodiment the contact tip spacing is approximately 100 times the height of the scanning tip, the scanning tip height being about 500 nm and the contact tip spacing being about 50 microns). Moreover, the lattice structure of arms 40a, 40b, 41 constitutes a simple yet effective mechanism providing the necessary flexibility for platform orientation while maintaining good overall stability and also rigidity in the longitudinal direction, this latter quality ensuring accurate longitudinal positioning of the scanning tip in operation. In addition, the self-aligning operation of the cantilever means that the loading force between platform and scan surface is less sensitive to thermal drift. Prior devices often require feedback mechanisms to control this loading force, whereas in this design the loading force is essentially internally defined and largely independent of thermal drift. Feedback mechanisms can thus be operated with much higher accuracy, or dispensed with altogether in some cases.

The arrangement where, as shown here, the scanning tip 36 is shorter than the contact tips 34 is particularly applicable for microscopy applications where scanning is performed without maintaining the scanning tip in contact with the sample surface. As the surface is scanned, interaction between the surface and scanning tip causes movement of the tip, via flexing of connecting portions 37, generally perpendicular to the extent of the surface. The provision of three, symmetrically arranged connecting portions 37, together with the connection to central flexible arm 41, ensures good stability here, and the arrangement allows scanning to be performed with a very small overall movement. The sensor elements 38 can be any convenient elements, e.g. piezoelectric elements, for sensing the scanning tip movement, and are located close to the scanning tip for high sensitivity. Three sensor elements are employed here for overall balance and stability, the combined responses being detected when supply lines S1, S2 are connected to appropriate detector circuitry as previously described.

The above embodiment can also be employed as a read/write device in data storage applications. Here, however, both read and write scanning require the scanning tip 36 to make contact with the storage medium surface. For this application, therefore, the scanning tip will typically be the same length as the contact tips 34 so that the scanning tip contacts the surface in the operating position. Here, a biasing force may be applied to the cantilever as a whole to provide the slight contact pressure for the write operation, or alternatively the scanning tip could be made slightly longer than the contact tips to provide a contact pressure. In any case, the scanning tip effectively forms a fourth contact tip, the four tips lying substantially in the same plane in the operating position. For write scanning, the heater required for the write operation could be provided separately of sensor elements 38 (e.g. directly beneath the scanning tip 36 in the view of FIG. 4), and powered by appropriate supply circuitry 14 (FIG. 2) via the same circuit as elements 38. In this case, any convenient sensor elements 38 may be employed as before. Most conveniently, however, elements 38 are thermal-resistive elements, formed by low doping of these areas to give a high resistance, which serve both as heaters for the write scan and sensors for the read scan. These are then operated by circuitry 14 at a first temperature for the write operation, and at a second, lower temperature for read detection. In any case, in addition to the advantages discussed above, the small scanning tip movement with this arrangement allows bits to be written at particularly high speeds.

Figure 6:
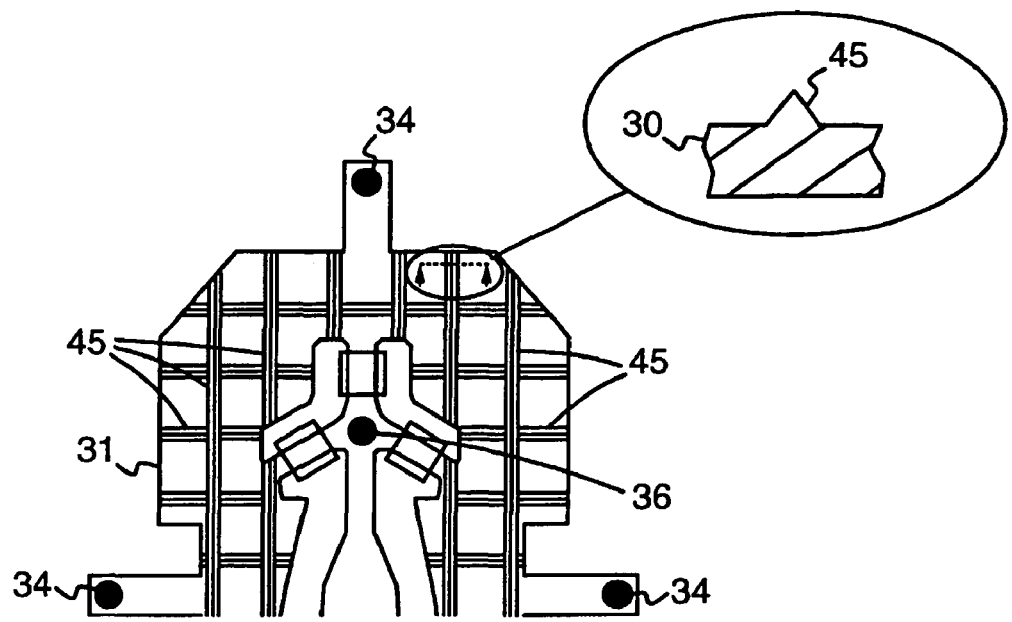
FIG. 6 shows a modification to the device of FIG. 4.

While the above embodiment represents a highly efficient design, various modifications to this basic design can be envisaged. FIG. 6 illustrates one such modification to the platform of the cantilever device. The platform here is generally similar to the platform 31 in FIG. 4 and like parts are labelled accordingly. Here, however, a plurality of ridges 45, arranged in a grid pattern, are formed on the tip-bearing surface of the platform. The ridges 45 are generally triangular in cross-section as illustrated by the enlarged section of the figure, the ridge height being less than that of scanning and contact tips 36, 34 to avoid interfering with the functioning of the tips. These ridges, which can conveniently be formed during the same etch processing stages as scanning tip 36, serve to strengthen the platform, providing improved rigidity and stability for a given platform thickness. This in turn allows the overall thickness of the platform to be reduced.

The above design can also be modified for use with various other detection mechanisms, such as optical detection for AFM applications for example. Here, the platform, or part thereof, could serve as a reflector for optical detection. As one particular example, a design can be envisaged where the scanning tip is located at the end of a small cantilever structure, formed within the body of the platform and angled downwardly relative to the platform body. Optical methods such as laser interferometry could then be employed to detect the pivotal movements of this smaller cantilever due to interaction of the scanning tip and sample surface. In other embodiments, scanning tip movement could be sensed capacitively. For example, the scanning tip could be mounted directly on a plate-like platform forming one plate of the capacitor, the other "plate" being provided by the scanning surface. Scanning tip movement could then be provided by flexing of the platform itself, and the resulting variations in the voltage dropped across the capacitor detected by an appropriate circuit. Other embodiments may employ a similar technique to provide a required force between the platform and scan surface, the voltage between the platform and sample being set to provide the desired force and control the spacing between scanning tip and sample. In this way, a non-contact, tapping mode or constant force measurement can be performed by detecting flexing of the platform piezoresistively or otherwise detecting scanning tip movements in operation. In other embodiments the platform may simply be trapped in the potential of the sample by the action of attractive electromagnetic forces, or in some cases by forces due to water films.

Figure 7:
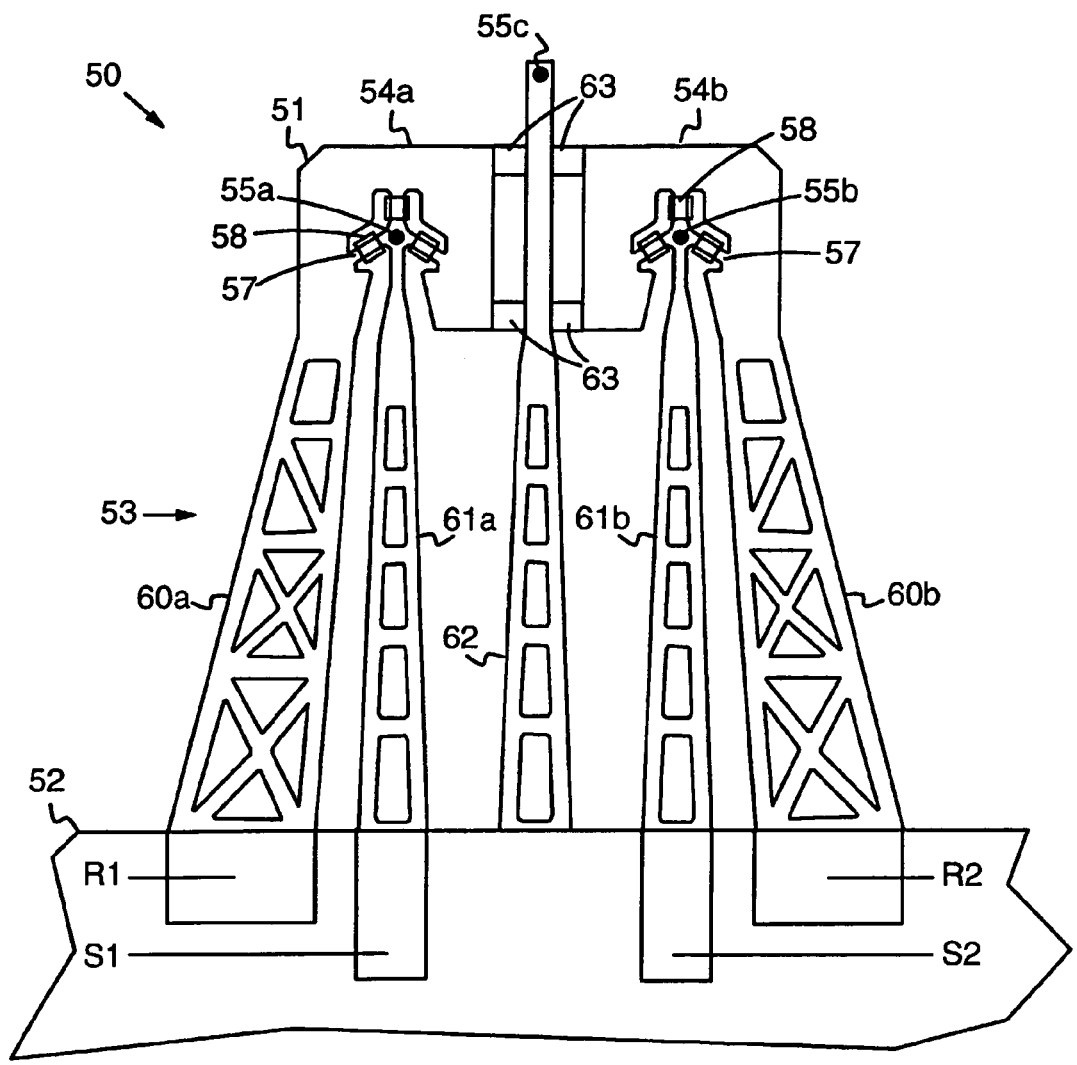
FIG. 7 is a schematic illustration of a second cantilever device embodying the invention.

Referring now to FIG. 7, the cantilever device 50 of this embodiment again comprises a tip platform 51 which is connected to a support 52 by a flexible arm arrangement indicated generally at 53. The platform 51 again has a substantially planar structure, but in this embodiment the platform is formed in two platform sections labelled 54a and 54b. Three contact tips 55a, 55b, 55c are provided on the platform in a symmetrical arrangement, the contact tip 55c being a blunt contact tip like tips 34 in the first embodiment described above. However, contact tips 55a and 55b are also scanning tips, and are thus nanometer-sharp tips of substantially the same length as contact tip 55c. These scanning tips 55a, 55b are mounted substantially centrally of platform sections 54a, 54b respectively, and are substantially equidistant from support 52. Each scanning tip 55a, 55b is connected to its section of the platform by three, symmetrically disposed, flexible connecting portions 57 which are equivalent to connecting portions 37 in the first embodiment. As in the first embodiment, a sensor is associated with each scanning tip 55a, 55b for sensing the scanning tip movement. Here, each sensor is again formed by three sensor elements 58 equivalent to elements 38 in the first embodiment.

Flexible arm arrangement 53 consists of five flexible arms having the advantageous lattice structure described above. A pair of outer arms 60a, 60b extend between the support 52 and the outer sides of respective platform sections 54a, 54b. A further pair of flexible arms 61a, 61b connect respective scanning tips 55a, 55b to support 52. In addition, a central flexible arm 62 connects contact tip 55c to the support as shown in the figure. This arm 62 extends between and beyond the platform sections 54a, 54b so that contact tip 55c is offset further from the support than tips 55a, 55b. The platform sections 54a, 54b are interconnected via central arm 62 by means of insulating portions 63, formed by low-doping of these regions to provide the required high resistance, whereby the two platform sections are electrically isolated from one another. The platform sections and at least arms 60a, 60b, 61a, 61b of the arm arrangement are formed of highly-doped silicon whereby each scanning tip sensor is connected in a current path via a respective outer flexible arm 60a, 60b, connecting portions 57 with sensor elements 58, the respective platform section 54a, 54b, and the respective tip-connecting arm 61a, 61b. Thus, when the arm-pairs 60a, 61a and 60b, 61b are connected to appropriate power supply and detector circuitry (such as elements 14 and 26 in FIGS. 2 and 3), the two scanning tips can be operated independently. In the general example shown here, the outer flexible arms 60a, 60b are connected to respective electrical supply lines R1, R2 on support 52, and arms 61a, 61b are connected to respective supply lines S1, S2 on the support, for connection to the detector circuitry. This particular arrangement allows both tips to be operated concurrently as may be desirable in some applications, but other arrangements can be envisaged. For example, both arms 61a, 61b may be connected to a single supply line S, or both arms 60a, 60b connected to a single supply line R, allowing selective operation of the scanning tips by connection of the appropriate pair of supply lines to the detector circuitry. Indeed, by incorporation of oppositely disposed diodes in the current paths for the two scanning tips, and application of different polarity voltages for operation of the two tips, the two tips can be selectively operated via a single pair of supply lines R and S, line R being connected to both outer arms 60a, 60b and line S being connected to both arms 61a, 61b. A reduced number of supply lines may be particularly desirable in cases where more than one device is operated in parallel, in particular for operation in an integrated array 12 as shown in FIG. 2.

The self-aligning operation of cantilever device 50 is equivalent to that described for the first embodiment above, and corresponding comments and operational advantages apply. Here, of course, the scanning tips 55a, 55b are also contact tips, but the degree of freedom perpendicular movement of these tips has a negligible effect on overall platform alignment. The length of connecting portions 57 in this embodiment is of the order of 1 micron, whereas the tip spacing is of the order of 100 microns. The effect of movement of each scanning tip on overall alignment and readings of the other tip is thus well within system noise levels.

The embodiment of FIG. 7 may be utilised for both AFM and data storage applications, and corresponding sensing techniques and modifications may be employed as discussed for the first embodiment above. However, the FIG. 7 embodiment is particularly advantageous for use in data storage applications, where two lines of data can be read simultaneously. In this case, where the two scanning tips are operated selectively, the read-scan outputs are of course digital rather than continuous, scanning tip movement, and hence data values, being detected by taking discrete sensor readings at each bit position. In practice in integrated data storage arrays 12 (FIG. 2) the readings are of course digital in any case, the devices being activated a row at a time for successive bit positions in the storage field. Embodiments can also be envisaged where more than two scanning tips are provided by appropriate formation of electrically isolated regions and conductive paths on the cantilever device. For example, by appropriate modification of the FIG. 7 embodiment the contact tip 55c could be utilised as a scanning tip. Guard tips 39 and/or strengthening ridges 45 as described in connection with the first embodiment may also be employed in the FIG. 7 embodiment. Various other modifications to the above embodiments can be envisaged. For instance, to provide the flexibility for platform orientation, only parts of the flexible arm arrangement 33, 53 may be made flexible, e.g. by forming isolated lattice-structure sections along the length of individual arms.

Figure 8:
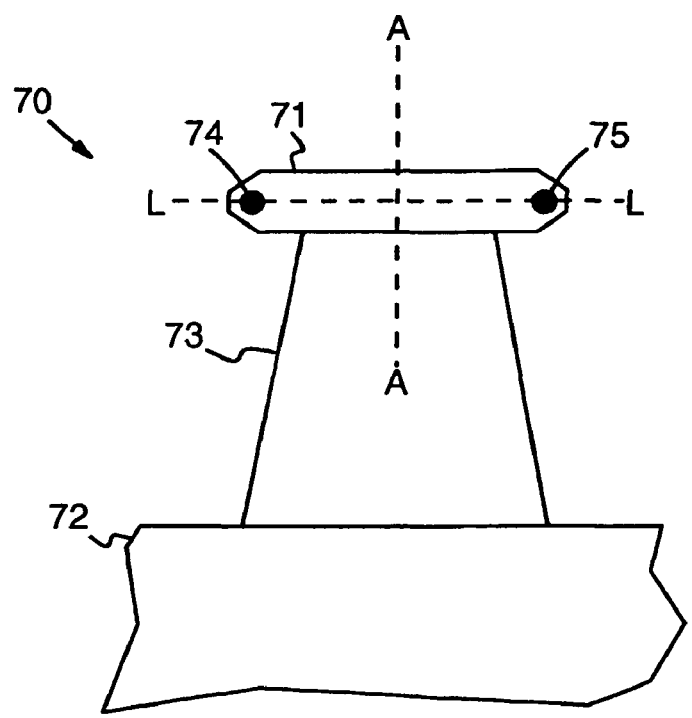
FIG. 8 is a schematic illustration of a third cantilever device embodying the invention.

The embodiments of FIGS. 4 and 7 employ three contact tips to enable alignment of the platform about two axes. For applications where alignment about a single axis is sufficient, a cantilever device with only two contact tips may be employed. FIG. 8 is a simplified schematic of such a device. The device 70 has a platform 71 connected to support 72 by a flexible arm arrangement indicated schematically at 73. This flexible arm arrangement 73 is preferably formed by one or more flexible arms having a lattice structure as described for the earlier embodiments. In this example, the platform has two contact tips 74, 75 disposed along a line L-L which is substantially perpendicular to the longitudinal extent of arm arrangement 73. Thus, as device 70 is brought into engagement with a scan surface, flexing of the arm arrangement allows orientation of the platform 71 about an axis A-A, perpendicular to line L-L, bringing tips 74, 75 into contact with the surface. With this general arrangement, a scanning tip (not shown) could be provided in addition to contact tips 74, 75, for example midway between the two contact tips. Alternatively, one of the two contact tips may function as the scanning tip. For example, contact tip 74 may be a blunt tip, and contact tip 75 may be a sharp tip serving as the scanning tip. Here, the motion of both tips, due to tilting of the platform during scanning, could be detected by appropriate sensors, though only scanning tip 75 will detect the small surface details. The difference between the two sensor outputs can then be taken to obtain the final scan output. Other arrangements can of course be envisaged, for example with the platform arranged at an angle, or parallel, to the longitudinal extent of the arm arrangement.

Figure 9:
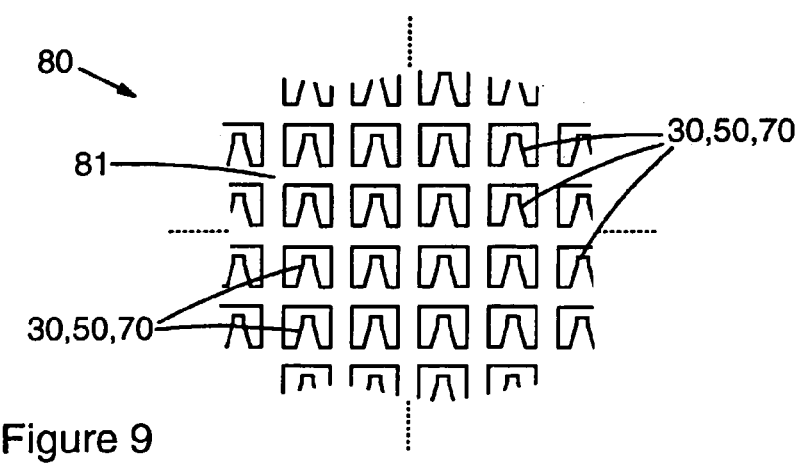
FIG. 9 is a schematic illustration of an array of cantilever devices embodying the invention.

As noted earlier, for some applications it may be desirable to operate multiple cantilever devices in parallel, for example in an array. FIG. 9 is a schematic illustration of scanning apparatus in the form of an array 80 of cantilever devices such as devices 30, 50, 70 described above. The devices 30, 50, 70 are arranged in rows and columns on an integral support structure 81. The support 32, 52, 72 for each cantilever device is thus provided by the integral support structure, the entire array being fabricated as an integrated circuit using semiconductor processing techniques of generally known type. The support structure 81 carries the electrical supply lines for connection of the devices to appropriate power supply and detector circuitry as described above. While use of such an array in microscopy applications can be envisaged, the array 80 is especially suitable for use as array 12 in the data storage device of FIG. 2, the cantilever devices having three contact tips as in the embodiments of FIGS. 4 and 7. In any case, the self-aligning design of the cantilever devices is particularly advantageous in such arrays, since the array as a whole can be appropriately positioned relative to the scan surface, and any slight misalignment of individual cantilevers is then corrected by the self-aligning operation described above.

While particular preferred embodiments, and modifications thereto have been described in detail above, it will be appreciated by those skilled in the art that many further variations and modifications may be made to the above embodiments without departing from the scope of the invention.

The invention claimed is:

1. A cantilever device for scanning a surface, the device comprising:
   a support;
   a tip platform having a plurality of tips comprising two contact tips providing points of contact with a surface to be scanned and a scanning tip for scanning the surface; and
   a flexible arm arrangement connecting the tip platform to the support and allowing orientation of the platform, via flexing of the arm arrangement, to bring the contact tips into contact with a surface to be scanned.

2. A device as claimed in claim 1 wherein the platform has three non-aligned contact tips providing points of contact with said surface, flexing of said arm arrangement allowing orientation of the platform to bring the three contact tips into contact with the surface.

3. A device as claimed in claim 2 wherein:
   at least three contact tips are spaced around the perimeter of the platform;
   the scanning tip is mounted substantially centrally of the platform and connected thereto by a plurality of flexible connecting portions allowing movement of the scanning tip generally perpendicular to the extent of the surface during scanning;
   the flexible arm arrangement comprises a pair of outer flexible arms extending between the platform and the support and a central flexible arm, disposed between the outer arms, connecting the scanning tip to the support;
   the device includes a sensor associated with the scanning tip for sensing said movement during scanning; and
   a current path, for electrical connection of the sensor between a pair of electrical supply lines on the support, is provided via the central flexible arm, the sensor, and a said outer flexible arm.

4. A device as claimed in claim 2 wherein:
   first and second scanning tips are mounted substantially equidistant from the support on respective first and second sections of the platform, each scanning tip being connected to the respective section of the platform by a plurality of flexible connecting portions allowing movement of the scanning tip generally perpendicular to the extent of the surface during scanning;
   a said contact tip is disposed between the first and second scanning tips, offset further from the support than the scanning tips;
   the flexible arm arrangement comprises first and second flexible arms connecting the first and second scanning tips respectively to the support, a central flexible arm disposed between the first and second flexible arms and connecting said contact tip to the support, and a pair of outer flexible arms extending between the support and the first and second sections respectively of the platform;
   the first and second sections of the platform are interconnected via the central flexible arm such that said first and second sections are electrically isolated from one another;
   the device includes a respective sensor associated with each sacnning tip for sensing said movement during scanning; and
   for each sensor, a current path for electrical connection of that sensor between a pair of electrical supply lines on the support is provided via a respective outer flexible arm, the sensor, and the flexible arm connecting the associated scanning tip to the support.

5. A device as claimed in claim 4 wherein the first and second scanning tips are contact tips.

6. A device as claimed in claim 1 wherein the tip platform has a plurality of scanning tips.

7. A device as claimed in claim 1 wherein the scanning tip is one of the contact tips.

8. A device as claimed in claim 1 wherein the tip platform has more than three contact tips, the free ends of the contact tips lying substantially in the same plane.

9. A device as claimed in claim 1 wherein the scanning tip is mounted on the platform for independent movement generally perpendicular to the extent of the surface during scanning.

10. A device as claimed in claim 9 wherein the scanning tip is connected to the platform by a plurality of flexible connecting portions.

11. A device as claimed in claim 9 including a sensor associated with the scanning tip for sensing said movement during scanning.

12. A device as claimed in claim 8 wherein the platform and flexible arm arrangement provide a current path for electrical connection of the sensor between a pair of electrical supply lines on the support.

13. A device as claimed in claim 1 wherein the flexible arm arrangement comprises a plurality of flexible arms extending between the platform and the support.

14. A device as claimed in claim 13 wherein the scanning tip is connected to the support by a flexible arm of the arm arrangement.

15. A device as claimed in of claim 13 wherein each flexible arm comprises a lattice structure.

16. A device as claimed in claim 1 wherein only two of said contact tips are provided on the tip platform, the two contact tips being disposed along a line substantially perpendicular to the longitudinal extent of the flexible arm arrangements, whereby flexing of the arm arrangement allows orientation of the platform about an axis perpendicular to said line.

17. A device as claimed in claim 16 wherein the flexible arm arrangement comprises a plurality of flexible arms, each flexible arm comprising a lattice structure.

18. A device as claimed in claim 1 wherein the platform has a plurality of guard tips disposed adjacent edges thereof to inhibit contact, during scanning, between said edges and the surface being scanned.

19. A device as claimed in claim 1 wherein the platform comprises a substantially planar structure having strengthening ridges formed on a surface thereof.

20. A cantilever device as claimed in claim 1 for scanning the surface of a data storage medium to read and write data thereon, wherein:
the or each scanning tip is arranged for contacting the surface in use;
the device includes a heater associated with said scanning tip for heating said surface at the point of contact with the scanning tip to allow penetration of the scanning tip; and
the platform and arm arrangement provide a current path for electrical connection of the heater between a pair of electrical supply lines on the support.

21. A device as claimed in claim 20 wherein said scanning tip is a contact tip.

22. A data storage device including the cantilever device as claimed in claim 20, said storage device comprising:
a data storage medium,
wherein the cantilever device is movable relative to the data storage medium for scanning the surface thereof; and
a detector for detecting movement of said scanning tip generally perpendicular to the extent of the surface during scanning.

23. Scanning apparatus including the cantilever device as claimed in claim 20, said scanning apparatus comprising:
an array of said cantilever devices; and
a support structure providing said support for each cantilever device and interconnecting the cantilever devices to form an integrated array.

24. A data storage device including a scanning apparatus as claimed in claim 23, said storage device comprising:
a data storage medium,
the scanning apparatus is movable relative to the data storage medium for scanning the surface thereof; and
a detector for detecting movement of each scanning tip of the array generally perpendicular to the extent of the surface during scanning.

25. A scanning probe microscope including the cantilever device as claimed in claim 1, said microscope comprising:
a sample support for supporting a sample to be scanned,
wherein the cantilever device is movable relative to the sample support for scanning the surface of a sample supported thereby; and
a detector for detecting interaction of the or each scanning tip with said surface during scanning.

26. A scanning probe microscope as claimed in claim 25 wherein the detector is arranged for detecting movement of said scanning tip generally perpendicular to the extent of the surface during scanning.

27. A scanning probe microscope as claimed in claim 26 wherein the scanning probe microscope is an atomic force microscope.

28. A scanning probe microscope including the cantilever device as claimed in claim 1, said scanning microscope comprising:
a sample support for supporting a sample to be scanned;
an array of said cantilever devices;
a scanning apparatus including a support structure providing said support for each cantilever device and interconnecting the cantilever devices to form an integrated array, the scanning apparatus being movable relative to the sample support for scanning the surface of a sample supported thereby; and
a detector for detecting interaction of each scanning tip of the array with said surface during scanning.

29. A scanning probe microscope as claimed in claim 28 wherein the detector is arranged for detecting movement of said scanning tip generally perpendicular to the extent of the surface during scanning.

30. A scanning probe microscope as claimed in claim 29 wherein the scanning probe microscope is an atomic force microscope.

* * * * *